United States Patent [19]

Rauthmann et al.

[11] 4,005,900
[45] Feb. 1, 1977

[54] VEHICLE ROOF WITH MOVEABLE PANEL
[75] Inventors: Axel Rauthmann, Dansweiler; Erwin Spiegel, Quadrath-Ichendorf, both of Germany
[73] Assignee: Ford Motor Company, Dearborn, Mich.
[22] Filed: Feb. 3, 1976
[21] Appl. No.: 654,813
[30] Foreign Application Priority Data
Mar. 21, 1975 Germany ............................ 2512426
[52] U.S. Cl. ............................... 296/137 B; 49/463
[51] Int. Cl.² ............................................. B60J 7/04
[58] Field of Search ........ 296/137 B, 137 E, 137 F; 49/389, 463–466
[56] References Cited
UNITED STATES PATENTS 3,572,822  3/1971  Schmid ......................... 296/137 F
3,949,624  4/1976  Bienert .......................... 296/137 B

FOREIGN PATENTS OR APPLICATIONS 1,142,512  1/1963  Germany ....................... 296/137 B Primary Examiner—Robert R. Song
Attorney, Agent, or Firm—John J. Roethel; Keith L. Zerschling

[57] ABSTRACT

A vehicle roof having a moveable panel arranged in a framed roof aperture. The panel can be deployed outwardly at its rear edge and can, if required, be detached completely from the roof frame. The panel is attached to the roof frame at its forward edge through at least two hinges and at its rear edge through a deploying mechanism comprising two lateral lever arms.

8 Claims, 4 Drawing Figures

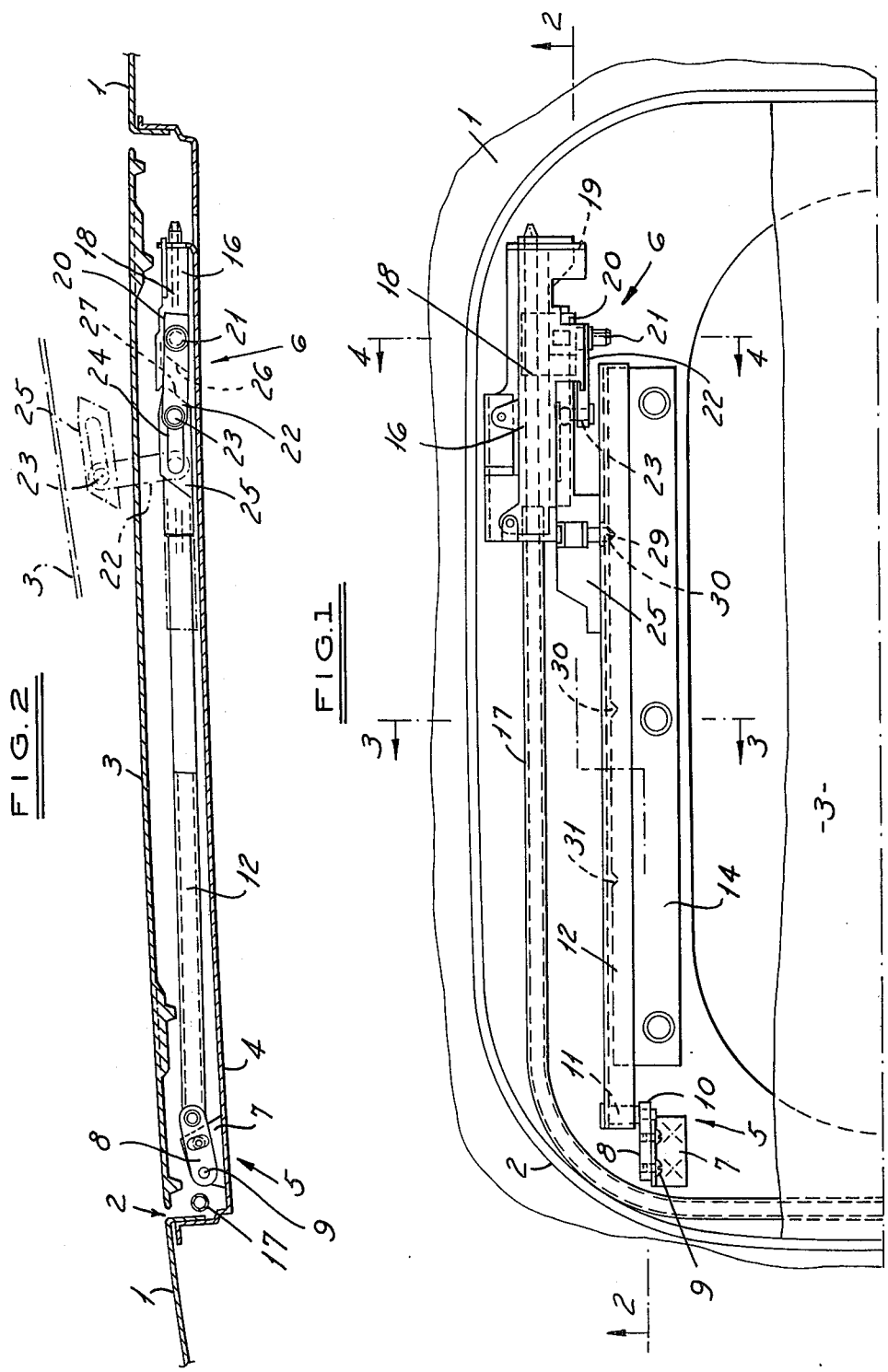

VEHICLE ROOF WITH MOVEABLE PANEL

BACKGROUND OF THE INVENTION

It is known in the prior art to install in an aperture in a vehicle roof a moveable panel having its front edge attached to a roof frame that frames the aperture through at least two hinges and its rear edge attached to the roof frame through a deploying mechanism. In the known installation the two hinges at the forward edge of the panel, and the deploying mechanism at the rear edge of the panel, are of detachable design, i.e., they can be at least partially detached or released from the roof frame, through the agency of plug-and-socket, detent or latching components, so that the panel can be detached complete with associated parts of the hinges and of the deploying mechanism. In order to detach the panel, therefore, it is additionally necessary to release the detent or latching components, or the plug-and-socket components, in which case different handles may be necessary. In order to fit the panel in the aperture, it is necessary in this context, for example, to introduce available plug-and-socket components into one another, or to place detent or latching components in their connecting positions. The various plug-and-socket, detent or latching components, may, if the panel is not properly assembled or if engagement is not properly completed due to the panel being out of alignment, give rise to disturbances in the operation of the normal deploying action of the panel. The known vehicle roof, therefore, has the drawback that the detachment and fitting of the panel can only be brought about by several manipulations and requires special skill. The object of the invention is to provide a vehicle roof of the kind introductorily described which can be deployed, detached and refitted substantially more simply, while retaining a straightforward and reliable construction.

SUMMARY OF THE INVENTION

The present invention relates to a vehicle roof having a panel arranged inside a roof aperture, which panel can be upwardly deployed at its rear edge and can, if required, be detached completely. A roof frame frames the aperture. The panel is attached to the roof frame at its forward edge through deploying mechanisms comprising two lateral lever arms movable to deploy the rear edge of the panel out of the aperture.

The improvement comprises connecting means coupling the hinge devices and the deploying mechanisms to lateral locating components extending parallel to lateral edges of the aperture. The locating components receive lateral guides attached to the panel which guides are disconnectable from the locating components to permit removal of the panel from the roof aperture.

The attachment of the hinges and the lateral lever arms via respective locating components extending parallel to the lateral edges of the roof aperture, as proposed in accordance with the invention, the locating components receiving the panel in displaceable and detachable fashion through the agency of lateral guides in the form of guide strips, reliably prevents the panel from twisting with consequent problems during normal deploying operations. Moreover, the deployed panel can be displaced into rearward ventilation positions by drawing it in the detachment direction in such a fashion that the force of two spring-loaded lateral detent pins is overcome until a new detent position is reached, whereupon the panel is locked in position again. To completely detach the panel, by pulling the panel further in the direction of detachment the force of the lateral spring-loaded detent pins is overcome and in order to lift the detent pins out of a final, steeper detent location, a somewhat heavier pull is needed. After overcoming the last detent facility, the panel can be removed completely from the locating elements, simply by pulling it. When refitting the panel, it is merely necessary to slide it into the two locating elements, the lateral detent pins engaging automatically. The detachment and refitting of the panel in the roof aperture, can thus be performed simply and quickly, and functional disturbances during the normal deploying action, as a consequence of inexpert handling, are very largely avoided. Because the components, such as hinges, locating elements and deploying mechanism, required for deploying and displacement, remain in position in the roof frame, it is possible at any time to exchange the detachable panel in a simple fashion so that for example an opaque panel having the same color as the vehicle color can readily and easily be exchanged for one which is transparent and possibly tinted.

Further features and advantages of the present investigation will be made more apparent as this description proceeds, reference being had to the accompanying drawings, wherein:

FIG. 1 is a reduced plan view of one side of a vehicle roof having a panel in an aperture, the panel in part being shown cut away in order to show up the hinge components and the deploying mechanism embodying the present invention more clearly;

FIG. 2 illustrates a vertical section on the line 2—2 of FIG. 1, through a hinge component in accordance with the invention and a deploying lever arrangement;

DETAILED DESCRIPTION OF THE INVENTION

Figure 3:
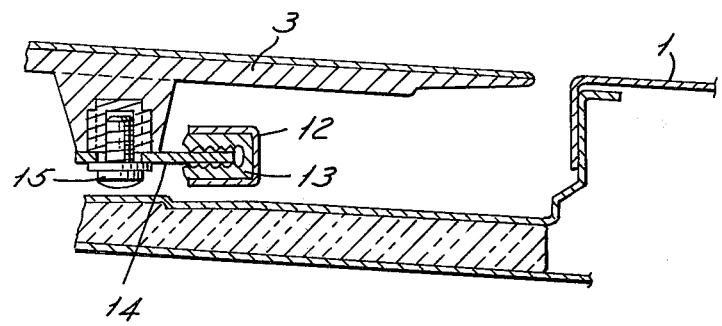
FIG. 3 illustrates a vertical section on the line 3—3 of FIG. 1, through a locating element in accordance with the invention.

FIG. 1 illustrates a vehicle roof 1 with a roof aperture 2 in which a panel 3 is arranged. The roof aperture 2 is here surrounded in the conventional manner, by a roof frame 4 attached to the vehicle roof 1 proper, through bent-over rim flanges and forming the supporting arrangement for the hinge components 5 and the deploying mechanisms 6. It will be understood that FIGS. 1 and 2 show the hinge component 5 and the deploying mechanism 6 located at one lateral edge of the aperture with these components being duplicated at the opposite lateral edge of the aperture.

The hinge components 5 consist of supporting brackets 7 attached to the roof frame 4 by spot-welding, to which a lever 8 is secured for limited displacement, by means of two screws 9. The lever 8, at its free end, receives a hinge pin 11 in a bore 10, the pin being connected to a locating element 12.

As FIG. 3 shows, the locating element 12 has a U-shaped cross-section open towards the interior, and is equipped with a known kind of slide arrangement 13, with a velvet floc finish, of the kind used for example in window guides. The locating elements 12 here receive guide strips 14 in displaceable fashion, these being attached by screws 15 to the flap 3.

The deploying mechanism 6 consist of guide housings 16 attached by screws to the roof frame, within the ends of which housings, through the agency of a conventional hand wheel or hand crank arrangement (not shown), cables 18 can displace within tubular guides 17. One end of the guide housings 16, in each case, can here be secured by a bracket 19 attached to the roof frame 4.

The handwheel or hand crank arrangement displacing the cables 18 within the tubular guides 17, is arranged at the forward edge on the roof aperture in the present example. The handwheel or hand crank arrangement can, however, equally well be located at the rear edge of the roof aperture. The details of the handwheel or hand crank arrangement have not been shown because these are well-known per se.

That end of the cable 18 projecting into the guide housing 16, is secured to an end piece 20 displaceably assembled in the guide housing 16. The end piece 20 is here provided with a pivot pin 21 for a deploying lever 22 the other end of which is assembled through a pivot pin 23 in a slotted hole 24 in a deploying element 25 attached to the locating element 12. The end piece 20 furthermore possesses a chamfer 26 which cooperates with a chamfer 27 on the deploying element 25 in such a fashion that during an initial motion of the end piece 20, in which the pivot pin 23 moves in the slotted hole 24, first of all the deploying lever 22 performs no deploying motion, while thereafter the two chamfers 26 and 27 on end piece 20 and deploying element 25 respectively, come into contact with one another and therefore lift one end of the deploying lever 22 so that the latter is raised from its extended position and becomes operative as a consequence of contact between the pivot pin 23 and the end of the slotted holes 24.

Figure 4:
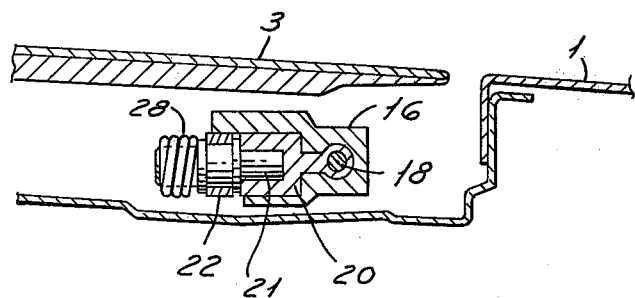
FIG. 4 illustrates a vertical section on the line 4—4 of FIG. 1, through a deploying lever arrangement in accordance with the invention.

FIG. 4 shows, around the pivot pin 21 there is a helical spring 28 which biases the deploying lever 22 toward its folded down position to prevent the deployed panel 3 from fluttering.

The deploying element 25 is here provided, in that of its zones connected to the locating element 12, with a springloaded detent pin 29 which cooperates with detents 30 and 31 at the edge of the guide strip 14 connected to the panel 3. With the panel 3 deployed, it can be manually shifted into various rearward-displaced ventilation positions, as required. The last detent 31 is here designed deeper and steeper in order to provide security against inadvertent complete displacement of the panel 3 out of the aperture. If the panel 3 is to be completely removed, then this detent can be overcome by applying a somewhat heavier pull in the direction of detachment.

The invention provides a vehicle roof with a deployable and detachable panel which moreover can be slid into rearwardly offset ventilation positions, once deployed. By virtue of the fact that the hinge components and the deploying mechanism are assembled in fixed fashion on the roof frame and exhibit no releaseable components, it is possible in association with measures designed to compensate for manufacturing tolerances, to achieve proper alignment of the panel so that proper operation is ensured during a normal deploying motion. By virtue of the fact that the requisite separation between detachable panel on the one hand and hinge components and deploying mechanism on the other, is provided in the form of a simple sliding guide, ease of handling during detachment and refitting of the flap is ensured.

It is to be understood this invention is not limited to the exact construction illustrated and described above, but that various changes and modifications may be made without departing from the spirit and scope of the invention as defined by the following claims:

We claim:

1. A vehicle roof having a panel arranged inside a roof aperture, which panel can be upwardly deployed at its rear edge and can, if required, be detached completely, a roof frame framing the aperture, the panel being attached to the roof frame at its forward edge through at least two hinge devices and at its rear edge through deploying mechanisms comprising two lateral lever arms movable to deploy the rear edge of the panel out of the aperture, wherein the improvement comprises:

connecting means coupling the hinge devices and the deploying mechanisms to lateral locating components extending parallel to lateral edges of the aperture, the locating components receiving guides attached to the panel, the guides being disconnectable from the locating components to permit removal of the panel from the roof aperture.

2. A vehicle roof as claimed in claim 1, in which:

the lateral locating components exhibit a lateral U-shaped cross section open toward the interior of the aperture, the guides comprise guide strips extending laterally from the panel, and spring loaded detent pins carried on the locating components coacting with detents on the guide strips securing the panel against inadvertent displacement axially of the locating components.

3. A vehicle roof as claimed in claim 2, in which:

each guide strip has at least three axially spaced detents, one for an internal at rest position, one for a central ventilation position and one for an external terminal position.

4. A vehicle roof as claimed in claim 3, in which:

the lateral locating component U-shaped cross section is internally lined with a low friction material of the kind used, for example, in window guide arrangements and exhibiting a velvet floc finish.

5. A vehicle roof as claimed in claim 4, in which:

each lateral deploying mechanism comprises, in addition to a lateral lever arm, a guide housing attached to the roof frame, an end piece displaceable in the guide housing, a displaceable, flexible, rack-like threaded cable coupled to the end piece for displacing the latter, and a pivot pin articulatingly attaching one end of the lateral lever arm to the end piece, the other end of the lever arm being attached by way of a second pin and slot connection to a rear end of a locating component, the end piece being provided with a chamfer which during initial displacement of the first mentioned pivot pin within the slot of the pin and slot connection abuts a complementary chamfer on the locating component to displace the lever arm out of extended position into an operative position during further displacement of the end piece to deploy the locating component and thereby the panel.

6. A vehicle roof as claimed in claim 2, in which:

the U-shaped cross section of the lateral locating component is internally lined with a low friction material of the kind used, for example, in window guide arrangements and exhibiting a velvet floc finish.

7. A vehicle roof as claimed in claim 6, in which:

each lateral deploying mechanism comprises, in addition to a lateral lever arm, a guide housing attached to the roof frame, an end piece displaceable in the guide housing, a displaceable, flexible, rack-like threaded cable coupled to the end piece for displacing the latter, and a pivot pin articulatingly attaching one end of the lateral lever arm to the end piece, the other end of the lever arm being attached by way of a second pin and slot connection to a rear end of a locating component, the end piece being provided with a chamfer which during initial displacement of the first mentioned pivot pin within the slot of the pin and slot connection abuts a complementary chamfer on the locating component to displace the lever arm out of extended position into an operative position during further displacement of the end piece to deploy the locating component and thereby the panel.

8. A vehicle roof as claimed in claim 1, in which:

each lateral deploying mechanism comprises, in addition to a lateral lever arm, a guide housing attached to the roof frame, an end piece displaceable in the guide housing, a displaceable, flexible, rack-like threaded cable coupled to the end piece for displacing the latter, and a pivot pin articulatingly attaching one end of the lateral lever arm to the end piece, the other end of the lever arm being attached by way of a second pin and slot connection to a rear end of a locating component, the end piece being provided with a chamfer which during initial displacement of the first mentioned pivot pin within the slot of the pin and slot connection abuts a complementary chamfer on the locating component to displace the lever arm out of extended position into an operative position during further displacement of the end piece to deploy the locating component and thereby the panel.

* * * * *